C. E. STELLER.
Bog Cutter.
No. 56,822.            Patented July 31, 1866.
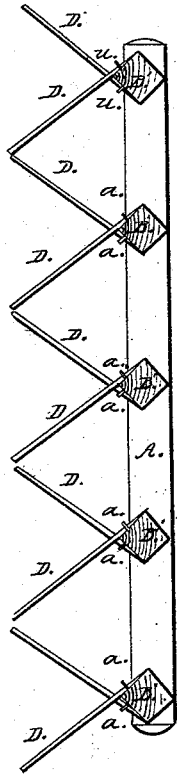
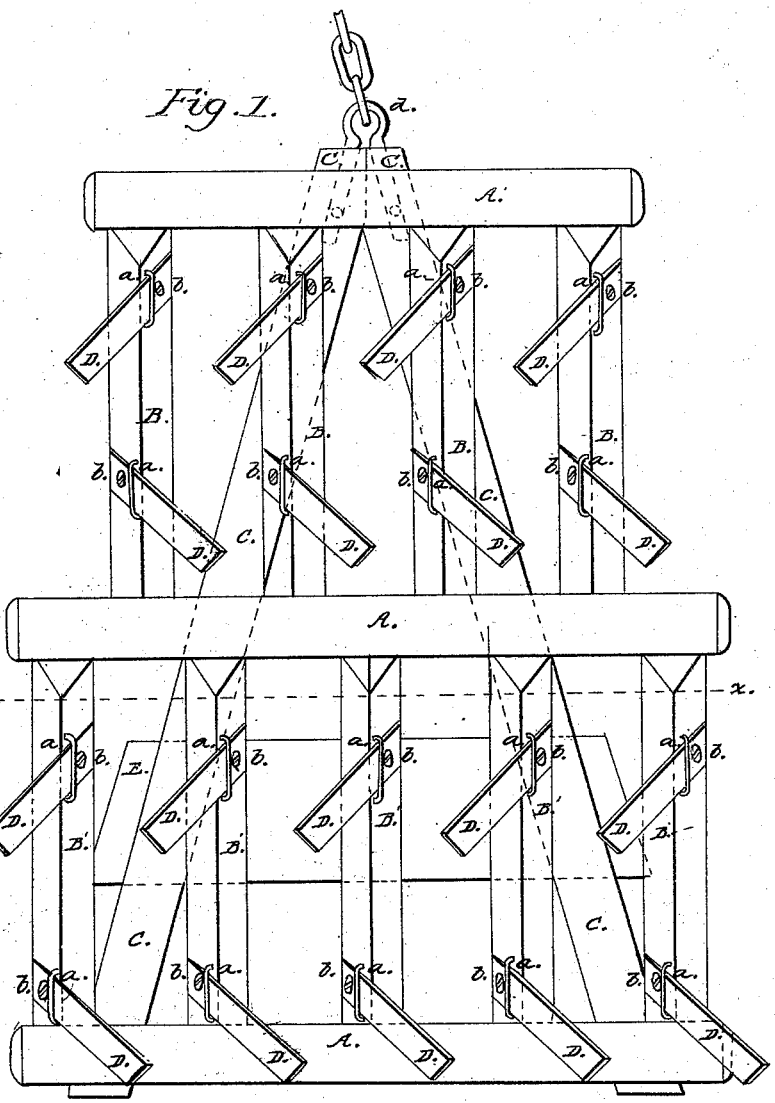

UNITED STATES PATENT OFFICE.

CHARLES E. STELLER, OF CHICAGO, ILLINOIS.

IMPROVEMENT IN BOG-CUTTERS.

Specification forming part of Letters Patent No. 56,822, dated July 31, 1866.

*To all whom it may concern:*

Be it known that I, CHARLES E. STELLER, of the city of Chicago, in the county of Cook and State of Illinois, have invented certain new and useful Improvements in Bog-Cutters; and I hereby declare that the following is a full, clear, and exact description thereof, reference being had to the accompanying drawings, making a part of this specification, in which—

Figure 1 is a plan view of the bottom of the cutter, and Fig. 2 a section at the red line $x$ $x$, showing the rear portion.

Like letters refer to similar parts in both figures.

The nature and object of my invention consist in so constructing that part of the frame composed of the beams or bars A A' B B' that the cutters D can be easily applied, and without cutting the beams B B' so as to materially weaken them, and so arranging the bars or beams B B' that the cutters or cutter-teeth attached to the beams B' shall cut the bogs or ground through the spaces left by the cutters which are attached to the beams B; in arranging the cutters D in four or more transverse rows, so that the machine will not be clogged by the bogs, sods, or other substances adhering to it in wet or moist grounds, as by this arrangement such substances as interfere with the perfect working of the machine are permitted to pass through between the cutters D, while the ground will still be cut sufficiently fine to accomplish the desired end, for by increasing the number of the transverse rows I am enabled to increase the distance between the cutters in each row and still preserve the same fineness of cut when all the cutter-teeth have passed over the ground; and in combining the several parts, as hereinafter set forth and claimed as new.

To enable others skilled in the art to make and use my invention, I now proceed to describe its construction and operation.

The beams or bars A A' B B' are all made of ordinary scantling, three by three. The beam A' is about three and a half feet in length, and the beams A A about four and a half feet in length. The beams B and B' are about two feet eight inches in length. I usually place four of them between the beams A and A', and five between the beams A A, all about eleven inches apart from center to center, and they are so attached to the beams A and A' that opposite angles will be vertical and horizontal, as shown in Fig. 2, and are so placed in the frame that those in the rear part, B', break joints with those in the front part, B, or placed so that either front or rear longitudinal beams are located midway in the spaces left by the others. The cutters D are placed in the sides of these beams by simple gains, which are cut a little deeper at the top than at the bottom, and bolts, or by bolts and staples or equivalents, and when so attached to the sides will incline to the right or left at angles of forty degrees, more or less.

The cutters or cutter-teeth are made of steel or other suitable metal. I usually make them about fifteen inches in length. They can be curved or straight on the edge, as may be desired, and should be quite sharp for turf or sod grounds. They are attached obliquely to the beams B and B', and incline backward or toward the rear of the machine at an angle of about forty-five degrees, more or less. The direction of the incline sidewise alternates with the rows, as shown in Fig. 1.

The arrangement of the cutters is such that those in the rear part of the frame cut that portion of the sod or soil over which the bars B pass, equally dividing the space left between the cutters in bars B.

It will be seen that the rear portion of the frame is broader than the front. I consider this an advantage, as I have found by experiment that the machine works better when the rear part is the heaviest.

The frame is strengthened by the brace-bars C, which are spread at the rear and brought together at the front with a sufficient projection for attaching the team to it by a clevis inserted through an eye, $d$, or by chain or any other well-known method.

A platform, E, may be placed on the rear end, if desired, and a driver's seat permanently or loosely attached thereto.

When completed this is a very useful and important agricultural implement for smoothing, leveling, and loosening meadow-grounds, for sowing grass-seed, and preparing the surface for mowing-machines, as it will cut, pulverize, and level bogs and hills and hummocks and other inequalities in the surface, and will cut and pulverize sod-land and newly-broken and turfy land, which is too tough for the common drag, and will be found much better than any ordinary harrow for pulverizing the ground under all circumstances.

This machine I consider a decided improvement over and upon the one for which Letters Patent were issued to me by the Patent Office of the United States of America on the 19th day of August, A. D. 1862, as well as upon all others in the particulars mentioned or claimed.

What I claim as my invention, and desire to secure by Letters Patent, is—

1. The frame A A' B B', constructed and arranged substantially as and for the purposes set forth.

2. The arrangement of the cutters D in four or more transverse rows, two of the rows inclining to the right and rear, in alternation with two inclining to the left and rear, the rear rows cutting through the spaces left by the front rows, substantially as set forth and shown.

3. The combination of a frame, A A' B B', constructed substantially as specified, with transverse rows of obliquely-placed cutters or cutter-teeth, the rows inclining alternately to the right and left, substantially as set forth and shown.

4. The combination and arrangement of the brace-bars C, the beams or bars A A' B B', and the oblique cutter-teeth D, substantially as shown, set forth, and specified.

CHARLES E. STELLER.

Witnesses:
L. L. BOND,
E. A. WEST.